United States Patent
Riordan, III et al.

(10) Patent No.: US 7,255,124 B2
(45) Date of Patent: Aug. 14, 2007

(54) QUICK COUPLER ANCHOR

(75) Inventors: John Emmett Riordan, III, Lynchburg, VA (US); Sean Brian Routon, Madison Heights, VA (US)

(73) Assignee: The Harrington Corporation, Lynchburg, VA (US)

( * ) Notice: Subject to any disclaimer, the term of this patent is extended or adjusted under 35 U.S.C. 154(b) by 355 days.

(21) Appl. No.: 10/669,322

(22) Filed: Sep. 25, 2003

(65) Prior Publication Data

US 2005/0067018 A1    Mar. 31, 2005

(51) Int. Cl.
*F16L 3/00*     (2006.01)
(52) U.S. Cl. ...................... 137/363; 248/545
(58) Field of Classification Search ............. 137/363, 137/364, 371, 372; 248/545
See application file for complete search history.

(56) References Cited

U.S. PATENT DOCUMENTS

| | | | | |
|---|---|---|---|---|
| 436,011 A * | 9/1890 | Allison | ...................... | 137/371 |
| 819,637 A * | 5/1906 | Diescher | ...................... | 256/57 |
| 3,342,444 A * | 9/1967 | Nelson | ...................... | 52/165 |
| 3,825,186 A * | 7/1974 | Heenan et al. | ............... | 239/280 |
| 3,850,128 A * | 11/1974 | Lovell | ...................... | 114/295 |
| 4,800,916 A * | 1/1989 | Lakey | ...................... | 137/343 |
| 5,575,308 A | 11/1996 | Marandi | | |
| 5,738,131 A * | 4/1998 | Wiley et al. | ............. | 137/15.09 |
| 5,984,587 A * | 11/1999 | Odle | ...................... | 405/244 |
| 6,231,083 B1 | 5/2001 | Marandi | | |

* cited by examiner

*Primary Examiner*—Eric Keasel
*Assistant Examiner*—Craig Schneider
(74) *Attorney, Agent, or Firm*—Nixon & Vanderhye, PC

(57) ABSTRACT

The quick coupler anchor includes an anchor body having a pair of vertical plates extending generally at right angles one to the other and spaced from one another. Planes containing the plates, when extended, intersect along a vertical line offset from the center axis of a valve received in a recess in a member connecting upper edges of the vertical extending plates. The recess has a plurality of flats for registration with the flats of the hex nut of the valve body. When the anchor is embedded in the ground with the recess about the hex nut, the anchor restrains rotational movement of the valve relative to the anchor in response to a torque applied to the valve to open or close the valve. The center of vertical support of the anchor lies generally coincident with the vertical axis of the valve to provide stability to the valve and anchor upon vertical loadings.

9 Claims, 3 Drawing Sheets

QUICK COUPLER ANCHOR

BACKGROUND OF THE INVENTION

The present application relates to a quick coupler anchor for engaging the valve of an underground fluid, e.g., water, supply system, and particularly relates to an anchor for restraining rotation of the valve relative to its connection with the underground fluid supply system when a torque is applied to the valve to open or close the valve and more particularly to an anchor which affords stability to the system under multi-directional loadings.

In underground water supply systems, for example, for irrigating golf courses, a water distribution supply pipe extends vertically below-ground and is coupled at its lower end to a main or branch water distribution pipe. The opposite end of the vertically disposed distribution pipe is threadedly coupled with a valve which terminates substantially flush with ground level. The valve has a cap and a cover typically overlies the cap. To open the valve and, hence, supply water to an above-ground distribution conduit, e.g., a hose, the cover is removed and the valve cap is pivoted out of the way. A bayonet-type connector is then inserted axially into the exposed valve. Upon rotation of the bayonet connector relative to the valve about the vertical axis, the interior mechanism of the valve opens to supply water to the above-ground conduit. Similarly, rotation of the bayonet connector in the opposite rotational direction closes the valve. When rotating the bayonet connector, however, the applied torque tends to rotate the valve relative to the supply pipe. As a consequence, the joint between the valve and supply pipe unthreads, causing leakage and, over time and with sufficient use, the valve may disconnect from the supply pipe. In the latter event, the valve can pop off the supply pipe with considerable force due to the high water pressure in the supply pipe and hence there arises a significant potential for injury.

Different types of restraints have been employed to prevent rotation of the valve relative to the distribution pipe upon rotation of the bayonet coupling when connecting the valve to the hose or conduit. For example, two types of anchors are described and illustrated in U.S. Pat. No. 5,575, 308. In the first type of anchor, an angle iron is coupled to the valve and extends horizontally from the valve to afford resistance to rotation of the valve when the valve is opened or closed by the bayonet connector. Another type of anchor is also disclosed in that patent and includes an open receptacle for receiving a hex nut, which forms part of the valve body. The anchor includes a pair of oppositely extending vertical vanes which, according to the patent, cooperate with the surrounding soil pack to resist torsional forces applied to the valve and maintain the connection between the valve and the supply pipe. However, such devices do not appear to be particularly stable. The one or more vertical vanes of the anchor, in both embodiments, are eccentric to the vertical axis of the valve. With that arrangement, vertical forces applied to the valve do not coincide or even substantially coincide with the center of support of the anchor, i.e., center of resistance to vertical movement relative to the soil. The converse is also true. This lack of coincidence of the vertical forces introduces a moment arm tending to tilt the valve and/or anchor upon application of the vertical force and hence renders the system unstable.

BRIEF DESCRIPTION OF THE INVENTION

In accordance with a preferred embodiment of the present invention, there is provided an anchor which restrains motion of the anchor/valve system from all directions and remains stable. Particularly, the anchor includes an anchor body for disposition in the ground. The anchor body includes a pair of generally spaced, vertically extending, plates lying in planes which, when extended, intersect one another along a generally vertical line offset from the axis of the valve. The plates are preferably at right angles to one another. The plates depend from a connecting member carried by the anchor body connecting the plates to one another along their upper margins. The connecting member has a laterally opening recess defined by angularly related flats engageable with the hex nut on the valve such that a torque applied to the valve is resisted by the attached anchor, i.e., by the depending plates.

The plates extend vertically a distance substantially at least twice the width of the plates at their largest width dimension in a horizontal direction. The vertical extent of the blades affords a large surface area in contact with the soil, providing substantial frictional resistance to vertical movement relative to the surrounding soil. By locating the plates in non-parallel planes, preferably at right angles to one another, extending the plates in a vertical direction to a substantial depth and orienting the plates vis-à-vis the recess receiving the valve, the center of support, i.e., center of resistance to vertical movement of the anchor relative to the surrounding soil, lies substantially or nearly coincident with the vertical axis through the valve. Stated differently, any moment arm between the vertical axis of the valve and the center of support of the anchor is either zero or sufficiently small as to be insignificant thereby eliminating or minimizing any tendency of the anchor or valve to tilt or cant in response to vertical loadings. The anchor and valve, when coupled together, are therefore highly stable.

The recess in the connecting member includes a plurality of angularly-related flats, preferably corresponding in dimension to the flats on the valve, i.e., on the internally threaded hex nut which secures the valve body to the supply pipe. One side of the recess is open, enabling the hex nut of the valve body to be received within the connecting member. An arm projects from the connecting member and forms a first flat diametrically opposed to a second flat, the first and second flats straddling the opening to the recess for receiving the hex nut of the valve body. With the valve body received in the recess, the centerline of the valve lies substantially coincident with the center of support afforded by the anchor. The valve centerline is also offset from or to one side of the vertical line lying at the intersection of the planes extending through the plates.

In a preferred embodiment according to the present invention, there is provided apparatus for restraining movement of a valve embedded in the ground, comprising an anchor for securement to the valve and including an anchor body for disposition in the ground and having at least first and second plates spaced from one another and extending generally vertically in discrete planes non-parallel to one another and which planes, when extended, intersect one another along a generally vertical line and a connecting member carried by the anchor body connecting the plates to one another and engageable with the valve to substantially minimize or eliminate rotational movement of the valve relative to the anchor in response to a torque applied to the valve to open or close the valve.

In a further preferred embodiment according to the present invention, there is provided an in-ground irrigation system, comprising a valve having a central vertical axis and threaded onto a pipe about the vertical axis, the valve including a valve body having a plurality of flats about the axis, an anchor for securement to the valve and including an anchor body disposed in the ground and extending at least partially about the valve, the anchor body including first and second plates spaced from one another and extending generally vertically in discrete planes non-parallel to one another and which planes, when extended, intersect one another along a generally vertical line laterally offset from the axis and a connecting member carried by the anchor body connecting the plates to one another and engaged with the valve, the anchor body including a recess having a plurality of angularly-related flats facing inwardly towards and engaging the flats of the valve body to substantially preclude rotation of the valve relative to the anchor body in response to a torque applied to the valve to open or close the valve.

In a further preferred embodiment according to the present invention, there is provided apparatus for restraining movement of a valve embedded in the ground, comprising an anchor for securement to the valve and including an anchor body having first and second plates extending generally vertically relative to the anchor body with inner edges of the plates spaced from one another, the plates extending in discrete planes non-parallel to one another and which planes, when extended, intersect one another along a generally vertical line and means carried by the anchor body for engaging the valve to substantially eliminate or minimize rotational movement of the valve relative to the anchor upon rotational movement applied to the valve to open or close the valve.

DETAILED DESCRIPTION OF THE INVENTION

Figure 1:
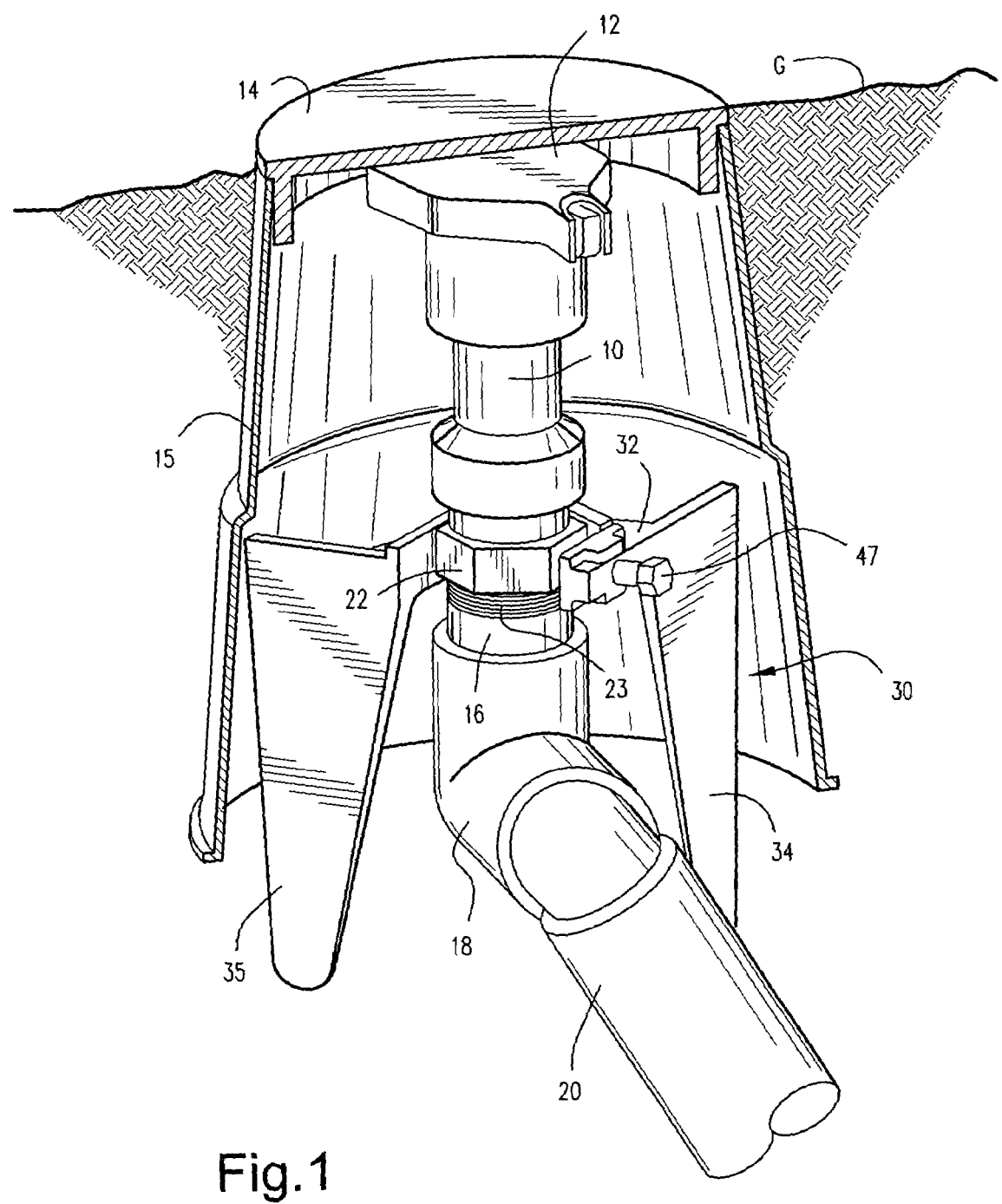
FIG. 1 is a perspective view of an underground water supply system including a valve and cover therefor, together with a quick coupler anchor constructed in accordance with a preferred embodiment of the present invention.

Referring now to FIG. 1, there is illustrated an underground fluid, e.g., water, distribution supply system, including a valve 10 disposed underground and terminating at its upper end in a pivoted valve cap 12. The valve cap 12 is, in turn, overlaid with a cover 14 lying generally flush at ground level G, the cover 14 forming part of a valve box 15 encapsulating valve 10. The valve 10 at its lower end is screwthreaded into a vertical pipe section 16, which, in turn, and through the use of an elbow 18, is coupled to a branch pipe 20. Branch pipe 20 may be connected to a main supply pipe, not shown, whereby water under pressure, is supplied to the valve 10. As illustrated, the lower portion of the valve 10 terminates in a hex nut 22 having female threads for threaded engagement with the male threads 23 on the pipe 16. As noted above, the valve 10, with the cover 14 removed and cap 12 pivoted back to expose the valve, is capable of receiving a conventional bayonet-type connector, not shown, for coupling the water supply system to a further conduit, e.g., a hose coupled to the bayonet-type connector.

The bayonet-type connector requires axial insertion into the open upper end of the valve 10 to engage complementary parts, also not shown, internal to the valve. Rotation of the bayonet connector and internal parts relative to the valve body opens and closes the valve. It will be appreciated that the opening and closing movement of the bayonet-type connector tends to torque the valve, i.e., unthread the hex nut 22 from the vertical pipe 16, resulting in leakage and possible decoupling of the valve 10 from the pipe 16.

Figure 2:
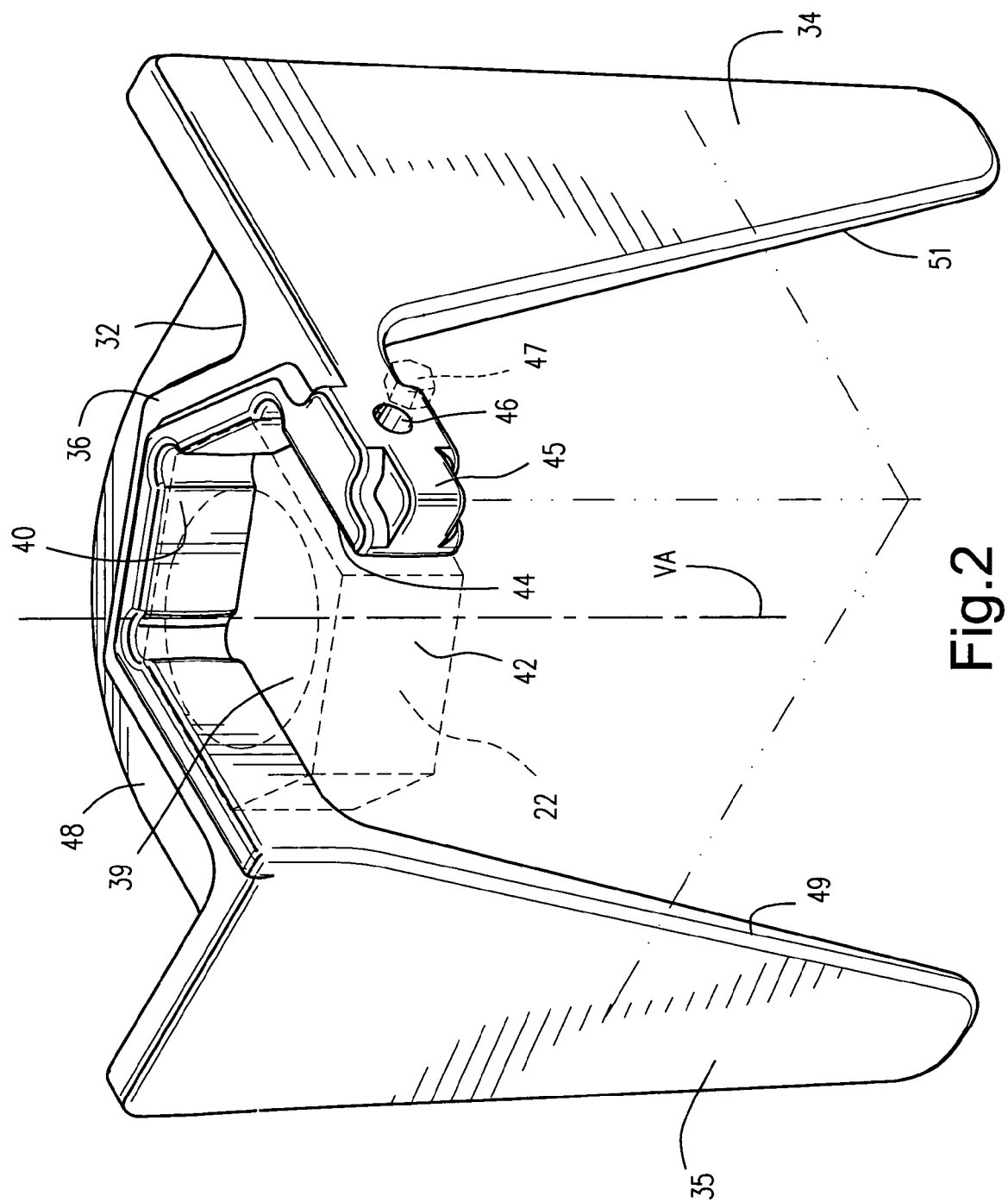
FIG. 2 is a perspective view of the anchor.
Figure 3:
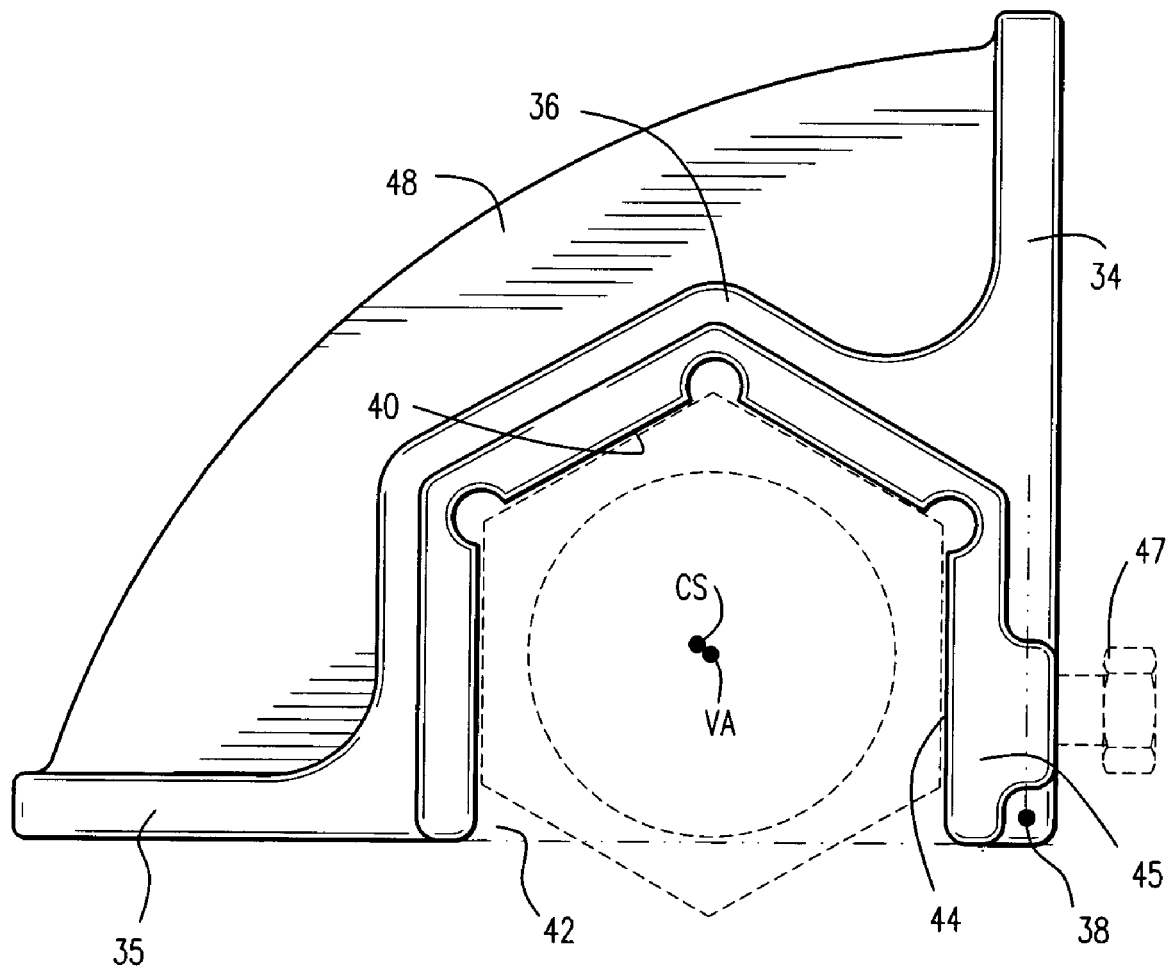
FIG. 3 is a plan view of the anchor with the valve disposed in the restraint illustrated in dashed lines.

To prevent rotation of the valve body 10 relative to the pipe 16 upon rotation of the bayonet connector and internal valve mechanism relative to the valve body, an anchor, generally designated 30, is provided. FIGS. 1 and 2 illustrate an anchor 30 includes an anchor body 32 comprised of no more than a pair of vertically extending plates 34, 35 and a connecting member 36 (FIG. 2). The plates 34, 35 extend in planes generally at right angles to one another. If extended, the planes would intersect along a vertical extending line 38 (FIGS. 2 and 3). The plates also have a height or depth to width ratio of at least 2:1, with the width dimension being at the widest part of each plate.

Connecting member 36 includes a recess 39 formed by angularly related anchor body flats 40. Recess 39 has a lateral opening 42 for receiving the hex nut 22. The flats 40 and their angular relationship relative to one another correspond dimensionally relative to the flats of the hex nut 22. A first flat 44 of connecting member 36 is carried by an arm or extension 45 projecting horizontally from one end of the connecting member 36. The arm 45 includes a threaded opening 46 for receiving a bolt 47 whereby the anchor 30 can be secured to the valve 10 about the hex nut 22. Connecting member 36 also includes a horizontal extending reinforcing member 48 which extends about the outer perimeter of the flats and between the upper margins of the right-angularly related plates 34, 35.

It will be appreciated that the principal resistance to vertical movement of the anchor when placed in the ground is the frictional resistance between the sides of the plates 34, 35 and the soil in which the anchor is engaged. The horizontal member 48 affords some additional resistance to vertical movement as well. The right angularly related plates 34, 35 and their location and configuration relative to the anchor body enable the center of support C.S. of the anchor, i.e., its center of resistance to vertical movement, to lie generally coincident or very close to the vertical axis V.A. or centerline of the valve 10 (FIG. 3). By extending the plates 34, 35 a substantial distance in a vertical downward direction, thereby increasing the frictional resistance to vertical movement and maintaining a separation between adjacent inner edges 51, 49 of the plates 34, 35, respectively, from one another, the center of support C.S. of the anchor 30 and the centerline axis V.A. of the valve lie closely aligned or coincident with one another. Hence, the anchor and valve are stable and not subject to loadings, tending to cant or tilt the anchor and valve relative to one another and to the surrounding soil. The plates 34, 35 also substantially eliminate any tendency of the valve to rotate relative to the pipe 16 upon insertion and rotation of the bayonet type connector relative to the valve to open or close the valve. By providing substantial vertical depth to the plates, the anchor has not only increased resistance to vertical movement but is further enabled to fit into existing valve boxes while maintaining stability in substantially all directions. The plates have a minimum height to depth ratio of 2:1 and preferably a height to depth ratio of 3:1 or more.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for restraining movement of a valve embedded in the ground, comprising:

an anchor for securement to the valve and including an anchor body for disposition in the ground and having no more than a pair of plates spaced from one another and extending generally vertically in discrete planes and which planes, when extended, intersect one another along a generally vertical line wherein said planes and said plates lying in said planes are oriented about 90° relative to one another, with said vertical line lying within said anchor body; and a connecting member carried by said anchor body connecting said plates to one another, said connecting member and said plates defining a lateral opening for receiving and engaging the valve to substantially minimize or eliminate rotational movement of the valve relative to the anchor in response to a torque applied to the valve to open or close the valve, wherein said lateral opening is defined by a plurality of angularly related flats extending between upper edges of said plates, said connecting member including an arm having a first flat of said plurality of flats in generally horizontal registration with a second flat of said plurality of flats, said first and second flats lying diametrically opposite one another and to one side of said vertical line, said first flat parallel to one of said pair of plate and said second flat parallel to said first flat and perpendicular to the other of said pair of plates.

2. Apparatus according to claim 1 wherein said connecting member lies to one side of the vertical line.

3. Apparatus according to claim 1 wherein said anchor has a center of support against vertical movement laterally offset from the vertical line.

4. Apparatus according to claim 1 wherein said connecting member includes a reinforcing plate extending generally horizontally between said vertically extending plates.

5. Apparatus according to claim 1 wherein said plates each have a height to width ratio of at least 2:1.

6. An in ground irrigation system, comprising:

a valve having a central vertical axis and threaded onto a pipe about said vertical axis, said valve including a valve body having a plurality of flats about said axis;

an anchor for securement to said valve and including an anchor body disposed in the ground and extending at least partially about said valve, said anchor body including no more than two plates spaced from one another and extending generally vertically in discrete planes non parallel to one another and which planes, when extended, intersect one another along a generally vertical line laterally offset from said axis; and a connecting member carried by said anchor body connecting said plates to one another, said connecting member and said plates defining a lateral opening for receiving and engaging said valve, said lateral opening defined by a plurality of angularly related flats facing inwardly towards and engaging the flats of said valve body to substantially preclude rotation of the valve relative to the anchor body in response to a torque applied to the valve to open or close the valve, wherein said connecting member including an arm having a first flat of said plurality of anchor body flats lying in generally horizontal registration with a second flat of said plurality of anchor body flats, said first and second anchor body flats lying diametrically opposite one another and to one side of said vertical line and on opposite sides of said lateral opening, said first flat parallel to said first plate and said second flat perpendicular to said second plate.

7. A system according to claim 6 wherein said connecting member lies to one side of the vertical line.

8. A system according to claim 6 wherein said planes and said plates lying in said planes are oriented about 90° relative to one another.

9. A system according to claim 6 wherein said anchor has a center of support against vertical movement, said center of support lying laterally offset from the vertical line and closely spaced to or coincident with the vertical axis.

* * * * *